United States Patent Office 3,134,093
Patented May 19, 1964

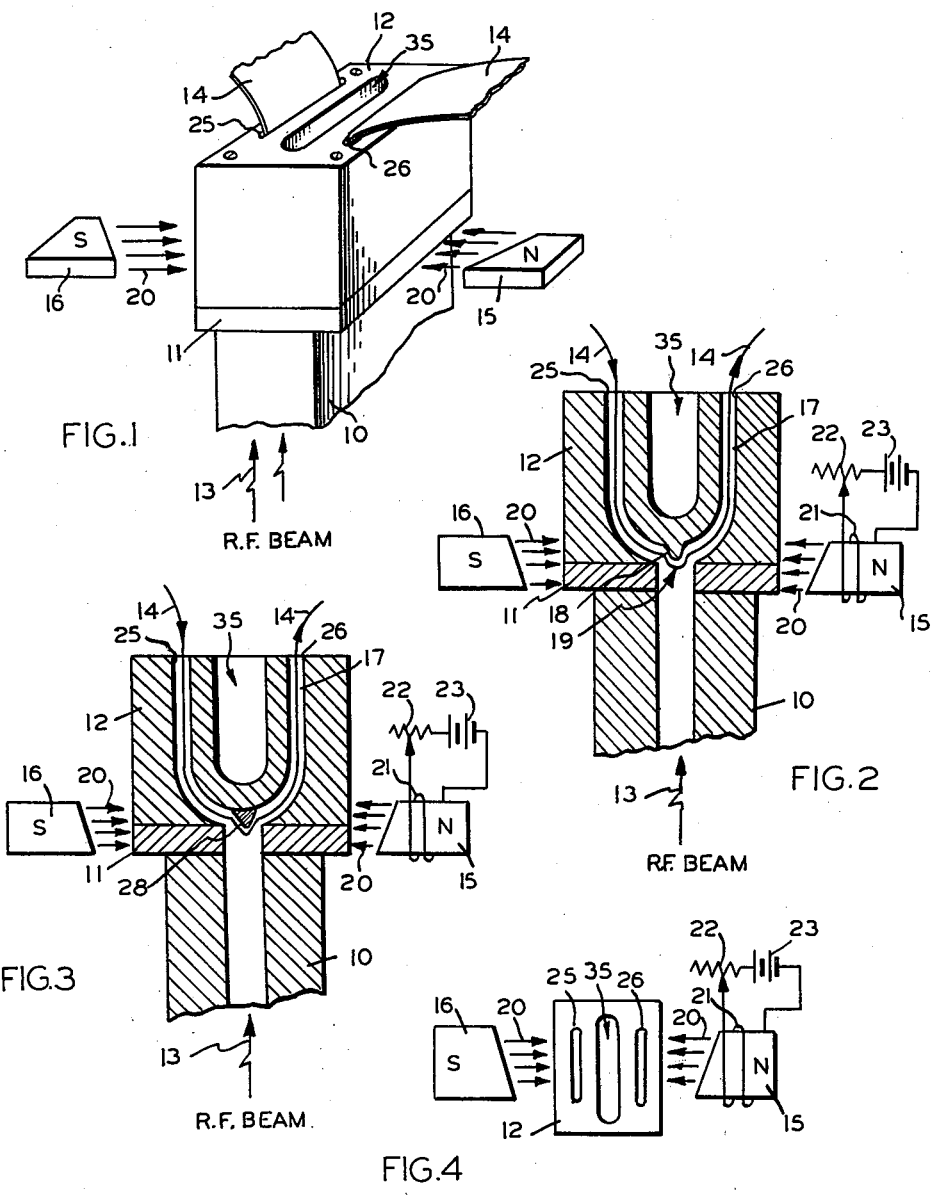

3,134,093
SPIN RESONANT TRANSDUCER
Harold C. Anderson, Rockville, Md., assignor to Litton Systems, Inc., Silver Spring, Md.
Filed July 2, 1963, Ser. No. 292,406
8 Claims. (Cl. 340—173)

This invention relates to improvements in transducers for microwave frequency signals, and more particularly to microwave cavity type transducers for converting time variable radio beams into frequency spectrum images for such purposes as recording or storage of information.

In copending applications of Kenneth E. Peltzer, Serial No. 102,429; Francis A. Ryder, Serial No. 292,405 filed July 2, 1963; and Harold C. Anderson et al., Serial No. 292,407 filed July 2, 1963, all of the same assignee, there is disclosed transducers for converting time variable radio beams or varying magnetic fields at microwave frequencies into frequency spectrum images in the form of heat patterns for recording or storage on a heat sensitive tape. These transducers employ frequency sensitive spin resonant materials that are tuned into frequency resonance with the microwave beam by means of high intensity magnetic fields being produced by external magnets or electromagnets.

In the construction of such transducers of the resonant cavity type, the recording tape is generally introduced into the microwave beam within the transducer, and consequently the tape is exposed to both the electric field vector and magnetic field vector of the beam. This exposure of the tape to the electric field vector is generally undesirable since it tends to create spurious microwave heating in the tape which interferes with or obscures the recording of the image. In the copending applications referred to above, the transducer is so constructed as to minimize the amplitude of the electric field vector applied to the recording tape thereby to reduce any such spurious microwave heating of the tape.

According to the present invention, there is provided a microwave cavity type transducer in which the transducer is constructed in such manner as to continuously shield the recording tape from the radio beam as the tape passes through the transducer except at the small region of the recording zone where the transfer of an image to the recording tape is being made. This recording zone is also disposed within the resonant cavity at a location of minimum intensity of the electric field vector, and consequently this combined shielding of the tape and preferred location of the recording zone considerably reduces any spurious heating of the tape by the microwave beam.

It is accordingly a principal object of the invention to provide a radio frequency recording transducer in which spurious heating of the recording medium is minimized.

A further object of the invention is to provide such a transducer incorporating a microwave shield to protect the recording medium against spurious microwave heating.

A still further object is to provide a radio frequency recording head having a more compact and lightweight construction.

Other objects and many additional advantages will be more readily understood by those skilled in this art after a detailed consideration of the following specification taken with the accompanying drawing, wherein:

FIG. 1 is a perspective view illustrating one preferred recording transducer construction according to the present invention, FIG. 2 is a cross sectional view of the transducer of FIG. 1, FIG. 3 is a cross sectional view similar to FIG. 2, and illustrating an alternative transducer construction, and FIG. 4 is a plan view observing the upper surface of the transducer and the position of the external energizing magnets.

Referring to the drawing, there is shown in FIG. 1 one preferred cavity type transducer construction according to the invention, being comprised of a section of rectangularly shaped waveguide 10, having a flanged portion 11 at one end thereof, and a recording head portion 12, connected to the flange 11 at that end of the waveguide. The recording head portion 12 is in communication with the waveguide 10 to receive a microwave radio beam 13 being introduced at the other end of the waveguide 10 and passed through the waveguide, as shown.

As best shown in FIG. 2, the radio beam 13 is applied at the lower end of the waveguide section 10 and propagated in a direction toward the recording head 12, and a recording tape 14 is fed through a narrow aperture 17 provided within the recording head 12 and having an opening at position 19 in communication with the waveguide where the tape 14 is exposed to the microwave radio beam 13 within the cavity. The waveguide section 10, the flange 11, and the recording head member 12 are all preferably formed of electrically conductive and nonmagnetic material, such as aluminum, brass or the like, and by proper design of the dimensions of these members provide a resonant cavity for the bandwidth of microwave frequencies of beam 13.

Being of electrically conducting material, these parts of the transducer provide an electrical shield about the microwave beam 13, and the narrow aperture 17 for guiding the recording tape 14 through the recording head 12 is made sufficiently narrow at the band of frequencies involved so as not to support the propagation of the radio beam 13 therethrough. For this reason, the recording head 12 functions as a short circuiting end wall of the cavity.

Since the radio beam cannot pass through the narrow slit or aperture 17, the only location where the recording tape 14 is exposed to the radio beam 13 is at the position 19, referred to above as the recording zone. Therefore, as a continuous length of tape 14 is fed through the aperture 17, the recording head 12, it is electrically shielded at all positions from the beam 13 except at the narrow region existing across the tape in the recording zone 19.

At this recording zone 19, the recording head 12 is provided with a slight projection portion 18 over which the tape 14 is guided, so that when the tape is fed through the head under a moderate tension, the small transverse section of the tape being exposed to the radio beam 13 is always guided in the same recording zone position within the microwave cavity.

As is well known to those skilled in the art, the conducting walls of a microwave cavity present a short circuit for the electrical vector of the radio beam and, therefore, since the recording zone 19 is located proximate a short circuiting wall, a minimum amplitude of the electric vector of the radio beam 13 exists in this region. For this reason and since the recording tape 14 is also shielded from the beam 13 as it passes through the transducer at all positions except for the narrow recording zone 19 where this minimum electric vector of the beam exists, the tape 14 receives a minimum degree of spurious microwave heating by the beam 13. On the other hand, as will be more fully explained below, the recording of intelligence on the tape results from a coupling of the magnetic vector of the radio beam with the tape, and since the magnetic vector is always at a maximum amplitude when the electric vector of the beam is at a minimum, the magnetic field for effecting the recording is maximized in the recording zone 19, as is desired.

According to a first embodiment of the invention, the tape 14 includes a frequency sensitive spin resonant material that is supported as an upper layer on the tape or is embedded therein. This material is tuned into resonance with the frequencies of the radio beam 13 by means of an externally applied static magnetic field 20 being produced by magnetic poles 15 and 16 or other low frequency field. Consequently, as the tape 14 is fed through the recording zone 19, a series of recorded images are produced on the tape as it is advanced through the recording head 12.

The spin resonant materials according to the present invention are those materials that are frequency sensitive and respond to different microwave frequencies in proportion to the amplitude of the low frequency magnetic field 20 that is applied to the spin resonant material, and at right angles to the magnetic component of the radio beam 13. For providing this magnetic field 20 in the form of a static field to tune the spin resonant material, a pair of magnet poles 15 and 16 are supported externally of the transducer, as shown, and are oriented with their pole faces along the broad walls of the rectangularly shaped recording head 12, as best shown in FIG. 4, thereby to apply a static magnetic field through the head to frequency tune the spin resonant material. Since the head is constructed of nonmagnetic material, the static magnetic flux 20 may penetrate the head 12 to energize the tape at the recording zone 19 in the manner described.

To record a frequency spectrum of the component frequencies of the beam 13, the magnetic field 20 may be made nonuniform or nonhomogeneous in a direction transversely across the tape, thereby to tune different locations along the tape to respond to different frequencies. As shown in FIG. 3, one manner of providing such a nonhomogeneous field is to form the magnets 15 and 16 with progressively diverging pole faces in a direction transversely across the transducer head. Due to the progressively increasing air gap resulting from this tapered pole face construction, the flux density 20 decreases along the width of the recording zone to tune each different position transversely across the width of the recording tape 14 to respond to a different microwave frequency.

In operation of the transducer, the magnetic field 20 being applied by the magnets 15 and 16 is initially adjusted, by such means as varying the current through the electromagnetic winding 21 by means of a variable resistor 22 and a voltage source 23, as shown, to tune the spin resonant material on the tape to a band of frequencies corresponding to those contained in the radio beam 13 to be recorded. The radio beam 13 is then introduced into the waveguide section 10 and propagated in a direction toward the recording zone 19. The recording tape 14 is inserted into the narrow shielded passage 17 in the recording head, passing through the inlet and outlet slots 25 and 26 located at the end of the head, as shown, and is continuously or continually fed through the head. As each narrow cross sectional area of the tape passes through the recording zone 19, it is exposed to both the radio beam 13, and to the static magnetic field 20, and a spectrum of frequencies corresponding to those contained in the radio beam 13 are recorded across the tape. Thus by moving the tape through the transducer, a continuous or continual series of frequency spectrum images may be recorded.

In an alternative embodiment of FIG. 4, the transducer is essentially of the same construction as in FIG. 2, except that in the recording zone 19, a solid rod of spin resonant material 28 is supported at the position formerly occupied by the projection 18 in FIG. 2, and the recording tape is, in this case, of a different composition and does not support a spin resonant material but merely contains a heat sensitive recording layer thereon or therein.

The rod of spin resonant material 28 is continually subjected to the radio beam 13 and to the static magnetic flux 20, and therefore produces frequency spectrum images of the beam in the form of heat patterns being produced in the rod 28. In passing through the recording head, the tape 14 is passed over the rod 28 in heat transferring contact, and the heat images are therefore transferred to the tape to effect recordings thereof.

The intensity of the radio beam 13 being applied to the rod 28 in the embodiment of FIG. 4 is controlled such that the absorption of energy in the rod 28 does not destroy the spin resonant condition of the rod material. Consequently, a succession of different heat images are produced in the rod 28 and decay in proportion to the changes in wave form and in frequency of the incoming radio beam 13.

In the embodiment of FIG. 4 as in the embodiment of FIG. 2, the tape 14 is subjected to the microwave beam only at the narrow recording zone where a minimum amplitude of the electric field vector exists, thereby to prevent any appreciable spurious heating of the tape by the beam 13. Similarly, although the rod 28 of spin resonant material is also continuously exposed to the beam 13 in the recording zone, spurious heating is likewise avoided as a result of the minimum electric field existing at this position of the cavity.

As is disclosed in much greater detail in the copending application above referred to, a number of different spin resonant materials may be employed for use in the recording tape of FIG. 1 or as the stylus 28 of FIG. 3, such as various paramagnetic materials, free radical materials, irradiated crystals, and others. One free radical material that has been found to be particularly useful in diphenylpicrylhydrazyl, which is a free radical material that is stable at ambient temperatures and obtainable on the open commercial market in solid particle form. Using this preferred material DPPH, a coating of spin resonant material may be applied over the tape 14 in the embodiment of FIG. 1, or may be formed as a solid stylus 28 as in the embodiment of FIG. 3.

A number of such spin resonant materials are available in the form of liquids or gases, such as the free radicals of ethyl, methyl, propyl, and hydroxyl, as is discussed in the earlier copending application of Harold C. Anderson, et al., Serial No. 73,695, and assigned to the same assignee. If it is desired to employ such a liquid or gaseous spin resonant material, either in the form carried by the tape 14 of FIG. 1, or as the stylus 28 in FIG. 3, the fluid material may be enclosed within a microwave transparent container or containers (not shown) having the desired shape, and having walls of heat transferring material, thereby enabling the transfer of the heat image being formed in the spin resonant material to a heat sensitive recording medium. In the copending application Serial No. 73,695, there is disclosed a number of recording tapes using spin resonant materials in fluid or solid form that may be employed in the transducer of FIG. 1, and in the copending application of Kenneth E. Peltzer and others above, there is described various spin resonant materials in the construction of stylus such as 28 in FIG. 3. Therefore, the present invention is not to be considered as being limited to any of such materials.

With respect to providing a heat sensitive recording medium on the tape 14, the tape may be formed of a suitable base of Mylar or the like, as noted above, having a coating of heat sensitive material thereon. A large number of heat sensitive materials are available on the open commercial market and well known as thermographic materials. One preparation producing a fairly good quality change in color when exposed to elevated temperatures is comprised of 30% of urea; 10% of nickel acetate; 3% of thiourea, and the remainder water. This composition is applied in a liquid form onto the base tape by means of flow coating or other known process, and is dried to produce a usable heat sensitive recording tape 14. A large number of other heat sensitive materials are also readily available that produced change of color when exposed to heat or otherwise vary their chemical or physical properties in a detachable manner when they are heated. Additional examples of such other heat sensitive mediums will be found in the copending applications discussed above, and in the published literature, and accordingly this invention is not to be considered as being limited to any specific heat sensitive composition or recording medium.

In many of these heat sensitive materials, the critical temperature required to bring about a change in color may be greater than that which is produced by the heat pattern produced in the spin resonant mass. In such instances, the tape 14 may be preheated (not shown) before being introduced into the transducer head, to a temperature just below the critical temperature or range necessary to affect the color change. Upon thereafter exposing the tape to the heat pattern produced in the spin resonant mass, the temperature of the tape at the discrete locations of the heat image is therefore sufficiently raised as to exceed the critical temperature and produce the desired recording of the heat pattern.

In the preferred embodiment of the recording head shown in the drawings, the tape 14 is introduced at the end wall of the recording head 12 through the inlet and outlet slots 25 and 26, as shown, to provide adequate space along the broad side walls of the head for the placement of the external magnets 15 and 16. It will be understood however that the tape may also be introduced at the sides of the transducer (not shown), if desired. The head 12 is also provided with a central opening 35 as best shown in the cross sectional views of FIGS. 2 and 3, for the purpose of dissipating any excess heat that may be produced in the narrow recording zone 19, although it will be understood that other means of cooling the head 12 may be used, such as the use of projecting fins, cooling fluid, or the like.

Although but preferred embodiments of the invention have been illustrated and described it is believed evident to those skilled in the art that many other changes may be made without departing from the spirit and scope of this invention. For example, although the preferred transducer is disclosed as being formed of a rectangularly shaped waveguide 10 and recording head portion 12, it is evident that otherwise shaped members may be employed to provide microwave cavities having a circular cross section or other known configuration that is capable of supporting a microwave radio beam 13 in any one of the desired and known modes. If desired, the cavity may be completely enclosed and the beam 13 introduced by means of a dipole, coaxial prod or the like. It is also believed evident that although the spin resonant material in the embodiment of FIG. 3, is disclosed as being in the form of a linear bar having a triangular cross section, other configurations of the stylus may be used with the same result.

Still other changes may be made in the manner of transferring the heat images to a separate heat sensitive recording medium, which may be in the form of individual heat sensitive cards or the like that are successively conveyed through the transducer head 12. The external magnets 15 and 16 may also be provided in varying shapes and configurations to produce other nonhomogeneous or nonuniform static or other low frequency magnetic fields having any desired number of configurations; or by the use of a series of separate magnets or electromagnets as might be desired and as is well known to those skilled in the art.

Since these and many other changes may be made without departing from the invention, this invention is to be considered as being limited only by the following claims appended hereto.

What is claimed is:

1. A microwave transducer comprising a member forming a microwave cavity and provided with means for receiving an electromagnetic wave, said member having a conducting wall to provide a short circuit for the electromagnetic wave at positions proximate the wall, said member being provided with means forming a narrow passageway therethrough that is shielded from the electromagnetic wave within the cavity with said narrow passageway adapted to accommodate a recording medium and said passageway being provided with an aperture opening into the microwave cavity for exposing the recording medium to the electromagnetic wave within the cavity only at said aperture, and magnetic means for directing a low frequency magnetic field through the member to provide magnetic flux at said aperture thereby to apply magnetic flux to the recording medium, whereby said medium is simultaneously energized by the low frequency magnetic field and is exposed to the electromagnetic beam only at said aperture.

2. A recording head for recording a microwave frequency radio beam comprising: a rectangular waveguide section for receiving the electromagnetic beam, a recording head member being connected to the waveguide section and having a narrow internal passageway extending through the head from an inlet to an outlet for receiving a continuous recording tape, said head member being formed with an opening in said passageway leading into the waveguide section, thereby to expose the tape to the microwave beam within the waveguide, and said head member being provided with a guide means adjacent said opening for guiding the tape at the same position through said opening, the internal passageway provided in said recording head member being sufficiently narrow at the frequency band of the beam to prevent the propagation of the beam therethrough from the waveguide, whereby said head member terminates the waveguide and provides a short circuit for the beam at the portion in said passageway opening into the waveguide, whereby at said opening there is provided a minimized electric field vector and a maximum magnetic field vector for application to the recording tape, and magnetic means for directing a low frequency magnetic field into the head member at the position of the opening of the passageway into the waveguide.

3. In the transducer of claim 2, said guide means within the head member containing a spin resonant material that is tuned by the low frequency magnetic field into energy absorptive relationship with the radio beam.

4. In the transducer of claim 2, said passage in the head member being formed in a U-shaped configuration and having an inlet and outlet at the end of the recording head member for introducing the tape into and out of the narrow passage in the direction of propagation of the beam through the waveguide.

5. A microwave transducer comprising: a waveguide portion having means for introducing an electromagnetic wave therein, a head member disposed at the end of the waveguide and providing a short circuiting end wall to the waveguide portion, said head member being provided with a narrow internal passageway to accommodate a recording medium through the head member, with the passageway having a narrow opening in communication with the interior of the waveguide at a position where a minimum electric field vector of the electromagnetic wave exists, said internal passageway within the head member being of such narrow dimensions at the frequency bandwidth of the electromagnetic wave as to prevent the propagation of the wave therethrough, whereby the head member shields the recording medium from the electromagnetic wave except at the opening that communicates the passageway with the interior of the waveguide, and magnetic means for producing a low frequency magnetic field at a position where said passageway opens into the waveguide, thereby to expose the recording medium to both the low frequency magnetic field and to the electromagnetic wave at said opening.

6. A cavity type recording transducer for high frequency electromagnetic signals comprising: means forming a cavity to receive the signal and having a location therein where the electric vector of the signal is minimized and the magnetic vector is maximized, means forming a passageway through said cavity to accommodate a recording medium and being shielded from the signal within the cavity, and means forming an opening from said passageway into communication with the signal within the cavity thereby to expose the recording medium to said signal at said opening, said last mentioned means providing said opening from the passageway to the signal at said location within the cavity where the electric field of the vector is minimized.

7. In the cavity transducer of claim 5, a spin resonant material supported within the recording zone, and means for tuning the material into reactive relationship with the signal.

8. In the cavity transducer of claim 5, said passageway being formed of such narrow dimensions as to preclude the transmission of the signal into the passageway.

References Cited in the file of this patent

UNITED STATES PATENTS 2,952,503     Becker _____ Sept. 13, 1960